US011979950B2

(12) United States Patent
Small et al.

(10) Patent No.: US 11,979,950 B2
(45) Date of Patent: May 7, 2024

(54) HEATER FOR CONTAMINANT REMEDIATION

(71) Applicant: TRS Group, Inc., Longview, WA (US)

(72) Inventors: Andrew B. Small, Charleston, SC (US); Daniel W. Oberle, Sylvania, OH (US)

(73) Assignee: TRS Group, Inc., Longview, WA (US)

( * ) Notice: Subject to any disclaimer, the term of this patent is extended or adjusted under 35 U.S.C. 154(b) by 454 days.

(21) Appl. No.: 17/167,600

(22) Filed: Feb. 4, 2021

(65) Prior Publication Data

US 2021/0259054 A1    Aug. 19, 2021

Related U.S. Application Data

(60) Provisional application No. 62/977,947, filed on Feb. 18, 2020.

(51) Int. Cl.
*H05B 3/06* (2006.01)
*B09C 1/06* (2006.01)

(52) U.S. Cl.
CPC .............. *H05B 3/06* (2013.01); *B09C 1/062* (2013.01); *B09C 2101/00* (2013.01)

(58) Field of Classification Search
CPC .. B09C 1/062; H05B 3/54; H05B 3/48; H05B 3/0014; H05B 3/06; H05B 3/42; H05B 1/0227; H05B 2203/003; H05B 2203/012; H05B 2203/014; H05B 2203/016; H05B 2203/017; H05B 3/0004; H05B 3/08; H05B 3/50; H05B 3/52; H05B 3/56; H05B 3/748; H05B 2203/013; H05B 2203/037; H05B 2214/03; H05B 3/03; H05B 3/22; H05B 3/44; F24H 1/0072; C02F 1/02; E21B 36/04; E21B 43/24; E21B 43/2401; E21B 43/281

USPC ....... 219/544, 200, 213, 481, 535, 541, 546, 219/553; 29/611; 338/241, 273, 305

See application file for complete search history.

(56) References Cited

U.S. PATENT DOCUMENTS

| 1,058,380 A | 4/1913 | Monnot |
| 1,372,743 A | 3/1921 | Gardner |
| 1,516,836 A | 11/1924 | Williamson |

(Continued)

FOREIGN PATENT DOCUMENTS

| AU | 2002365145 A1 | 7/2003 |
| AU | 2006323431 A1 | 6/2007 |

(Continued)

OTHER PUBLICATIONS

Technical Memorandum Regarding Bench Scale VEG REsearch & Development Study: Implementation Memorandum for Ex-Situ Thermal Desorption of Perfluoroalkyl Compounds (PFCs) in Soils, Endpoint Consulting, Inc., Mehrdad Javaherian, Phd., Pe, LEED GA, Feb. 26, 2016.

(Continued)

*Primary Examiner* — Vy T Nguyen
(74) *Attorney, Agent, or Firm* — Barnes & Thornburg LLP; Joan Taft Kluger

(57) ABSTRACT

A heater for thermal conduction heating suitable for use in non-vertical heater wells for purposes of soil remediation. The heater includes a rigid bar to position a non-insulated heating element in the casing away from the interior surface of the casing.

14 Claims, 5 Drawing Sheets

(56) References Cited

U.S. PATENT DOCUMENTS

| | | |
|---|---|---|
| 1,911,063 A | 5/1933 | Daly |
| 2,112,729 A | 3/1938 | Abbott |
| 2,499,961 A | 3/1950 | Lennox |
| 2,685,930 A | 8/1954 | Albaugh |
| 2,722,278 A | 11/1955 | Kaasa |
| 2,799,641 A | 7/1957 | Bell |
| 2,801,090 A | 7/1957 | Hoyer et al. |
| 2,818,118 A | 12/1957 | Dixon |
| 2,902,270 A | 9/1959 | Salomonsson et al. |
| 3,106,244 A | 10/1963 | Parker |
| 3,137,347 A | 6/1964 | Parker |
| 3,149,672 A | 9/1964 | Orkiszewski et al. |
| 3,153,342 A | 10/1964 | Pierce et al. |
| 3,438,444 A | 4/1969 | Wilkerson |
| 3,507,330 A | 4/1970 | Gill |
| 3,642,066 A | 2/1972 | Gill |
| 3,674,985 A | 7/1972 | Ragault |
| 3,678,249 A | 7/1972 | Lennox |
| 3,813,771 A | 6/1974 | Skogland |
| 3,848,671 A | 11/1974 | Kern |
| 3,862,662 A | 1/1975 | Kern |
| 3,920,963 A | 11/1975 | Beasley |
| 3,948,319 A | 4/1976 | Pritchett |
| 3,958,636 A | 5/1976 | Perkins |
| 4,010,799 A | 3/1977 | Kern et al. |
| 4,084,637 A | 4/1978 | Todd |
| 4,158,764 A | 6/1979 | Yane |
| 4,228,854 A | 10/1980 | Sacuta |
| RE30,738 E | 9/1981 | Bridges et al. |
| 4,376,244 A | 3/1983 | Gellert |
| 4,376,598 A | 3/1983 | Brouns et al. |
| 4,495,990 A | 1/1985 | Titus et al. |
| 4,545,435 A | 10/1985 | Bridges et al. |
| 4,593,182 A | 6/1986 | Schwarzkopf |
| 4,662,438 A | 5/1987 | Taflove et al. |
| 4,670,634 A | 6/1987 | Bridges |
| 4,721,847 A | 1/1988 | Levernz |
| 4,900,196 A | 2/1990 | Bridges |
| 4,956,535 A | 9/1990 | Buelt et al. |
| 4,957,393 A | 9/1990 | Buelt et al. |
| 4,984,594 A | 1/1991 | Vinegar et al. |
| 4,988,427 A | 1/1991 | Wright |
| 5,011,329 A | 4/1991 | Nelson et al. |
| 5,018,576 A | 5/1991 | Udell et al. |
| 5,024,556 A | 6/1991 | Timmerman |
| 5,076,727 A | 12/1991 | Johnson et al. |
| 5,114,497 A | 5/1992 | Johnson et al. |
| 5,169,263 A | 12/1992 | Johnson et al. |
| 5,190,405 A | 3/1993 | Vinegar et al. |
| 5,193,934 A | 3/1993 | Johnson et al. |
| 5,221,827 A | 6/1993 | Marsden, Jr. et al. |
| 5,233,164 A | 8/1993 | Dicks et al. |
| 5,244,310 A | 9/1993 | Johnson |
| 5,286,141 A | 2/1994 | Vigneri |
| 5,316,411 A | 5/1994 | Buelt et al. |
| 5,318,116 A | 6/1994 | Vinegar et al. |
| 5,330,291 A | 7/1994 | Heath et al. |
| 5,347,070 A | 9/1994 | Heath et al. |
| 5,398,756 A | 3/1995 | Brodsky et al. |
| 5,420,402 A | 5/1995 | Bridges et al. |
| 5,449,251 A | 9/1995 | Daily et al. |
| 5,485,232 A | 1/1996 | Saito et al. |
| 5,545,803 A | 8/1996 | Heath et al. |
| 5,558,463 A | 9/1996 | Geisel |
| 5,621,844 A | 4/1997 | Bridges |
| 5,674,424 A | 10/1997 | Iben et al. |
| 5,769,569 A | 6/1998 | Hosseini |
| 5,907,662 A | 5/1999 | Buettner et al. |
| 5,954,452 A | 9/1999 | Goldstein |
| 5,975,799 A | 11/1999 | Carrigan |
| 5,986,159 A | 11/1999 | Aines et al. |
| 5,994,670 A | 11/1999 | Buettner |
| 6,023,554 A | 2/2000 | Vinegar et al. |
| 6,073,695 A | 6/2000 | Crawford et al. |
| 6,285,014 B1 | 9/2001 | Beck et al. |
| 6,485,232 B1 | 11/2002 | Vinegar et al. |
| 6,533,499 B2 | 3/2003 | Breeding |
| 6,596,142 B2 | 7/2003 | McGee |
| 6,596,190 B1 | 7/2003 | Igawa et al. |
| 6,632,047 B2 | 10/2003 | Vinegar et al. |
| 6,824,328 B1 | 11/2004 | Vinegar et al. |
| 6,951,436 B2 | 10/2005 | Stegemeier et al. |
| 7,004,678 B2 | 2/2006 | Stegemeier et al. |
| 7,290,959 B2 | 11/2007 | Beyke et al. |
| 7,534,926 B2 | 5/2009 | Stegemeier et al. |
| 7,618,215 B2 | 11/2009 | Haemers et al. |
| 8,348,551 B2 | 1/2013 | Baker et al. |
| 8,453,739 B2 | 6/2013 | Parsche |
| 8,820,406 B2 | 9/2014 | Harris |
| 9,364,877 B2 | 6/2016 | Brady |
| 9,370,809 B2 | 6/2016 | Brady et al. |
| 9,718,103 B2 | 8/2017 | Haemers |
| 2002/0013508 A1 | 1/2002 | McGee |
| 2002/0018697 A1* | 2/2002 | Vinegar .......... H05B 3/03 405/128.55 |
| 2003/0173080 A1 | 9/2003 | Berchenko |
| 2003/0173082 A1 | 9/2003 | Vinegar |
| 2003/0196801 A1 | 10/2003 | Vinegar |
| 2007/0023418 A1 | 2/2007 | Schlipf |
| 2008/0078551 A1 | 4/2008 | De Vault et al. |
| 2010/0089584 A1 | 4/2010 | Burns |
| 2010/0147826 A1* | 6/2010 | Schlipf .......... H05B 3/48 219/481 |
| 2011/0295504 A1 | 12/2011 | Barber et al. |
| 2013/0202363 A1 | 8/2013 | Haemers |
| 2013/0206748 A1 | 8/2013 | Vinegar et al. |
| 2015/0001206 A1 | 1/2015 | Schlipf |
| 2015/0010359 A1 | 1/2015 | Geckeler |
| 2016/0053596 A1 | 2/2016 | Rey |
| 2016/0295641 A1 | 10/2016 | Boehmer |
| 2020/0353520 A1 | 11/2020 | Seeman et al. |

FOREIGN PATENT DOCUMENTS

| | | |
|---|---|---|
| CA | 2123410 | 5/1993 |
| CA | 1322106 C | 9/1993 |
| CA | 2874626 A1 | 11/2016 |
| CN | 108856271 A | 11/2018 |
| CN | 110280576 A | 9/2019 |
| DE | 69228194 T2 | 5/1993 |
| EP | 0612273 B | 5/1993 |
| GB | 671117 A | 4/1952 |
| WO | 2005019110 A2 | 3/2005 |
| WO | 2017131972 A1 | 8/2017 |
| WO | 2018097875 A1 | 5/2018 |

OTHER PUBLICATIONS

Concawe Environmental Science for the European Refining Industry Report No. 8/16, Environmental fate and effects of poly- and perfluoroalkyl substances (PFAS), Prepared ARCADIS for the Concawe Soil and Groundwater Taskforce (STF/33), Brussels, Jun. 2016.

Article on the Effect of Temperature on Volatilization of Alkali Salts During Dry Ashing of Tetrafluoroethylene Fluorocarbon Resin.

Groundwater and PFAS: State of Knowledge and Practice, Remediation and Treatment, Section 8, prepared by National Ground Water Association.

* cited by examiner

HEATER FOR CONTAMINANT REMEDIATION

BACKGROUND

Soil contamination may be remediated by various thermal techniques, such as conduction heating. Thermal conduction heating is performed by conductive heat transfer using heater wells installed into the soil. The heater wells include a metal casing with an electrical resistance heating wire within the casing. One or more heater wells are installed to create a temperature gradient in the soil to establish conductive heat transfer through the soil from the heater wells. When the temperature of the heater well is higher than the surrounding soil, heat energy will flow to the soil.

Conventional heater wells work well when the metal casing is installed vertically. However, if the casing is not disposed vertically, heating components within the casing may deviate from an optimum position. For example, in non-vertical casings, a conventional heater may assume an angle to the longitudinal line of the casing. This may cause the heating element to contact the metal casing causing a short. Additionally, a poorly positioned heating element may cause heat to be unevenly distributed. Accordingly, there is a need for a reliable heater that can be inserted into a heater well that is at a non-vertical angle.

SUMMARY

A heater is disclosed that can be used for heating in a non-vertical casing for purposes of soil remediation. The heater includes a rigid support to position a non-insulated heating element in the casing away from the interior surface of the casing. The rigid support includes heater clips with insulated or non-conducting guides through which the heating element is disposed. The rigid bar and other heater components may be selected to optimize the heating characteristics of a heater well.

DESCRIPTION OF THE DRAWINGS

The detailed description refers to the figures, which depict illustrative embodiments.

DETAILED DESCRIPTION OF EMBODIMENTS

The figures and descriptions provided herein are all of illustrative embodiments and may have been simplified to illustrate aspects that are relevant for an understanding of the described devices, systems and methods, while eliminating, for the purpose of clarity, other aspects that may be found in typical devices, systems and methods. Those of ordinary skill in the art may recognize that other elements and/or operations may be desirable or necessary to implement the devices, systems and methods described herein. Because such elements and operations are well known in the art, and because they do not facilitate a better understanding of the present disclosure, a discussion of such elements and operations may not be provided herein. However, this disclosure is deemed to inherently include all such elements, variations and modifications to the described aspects that could be implemented by those of ordinary skill in the art.

Embodiments of the disclosed heater can be used for heating in a horizontal casing or other non-vertical casing for purposes of soil remediation. Although designed for non-vertical casings, the disclosed heater may also be used for vertical casing. Embodiments of the disclosed heater may be particularly useful for heating below buildings, roads or other areas that are inaccessible or difficult to reach from directly above.

Figure 1:
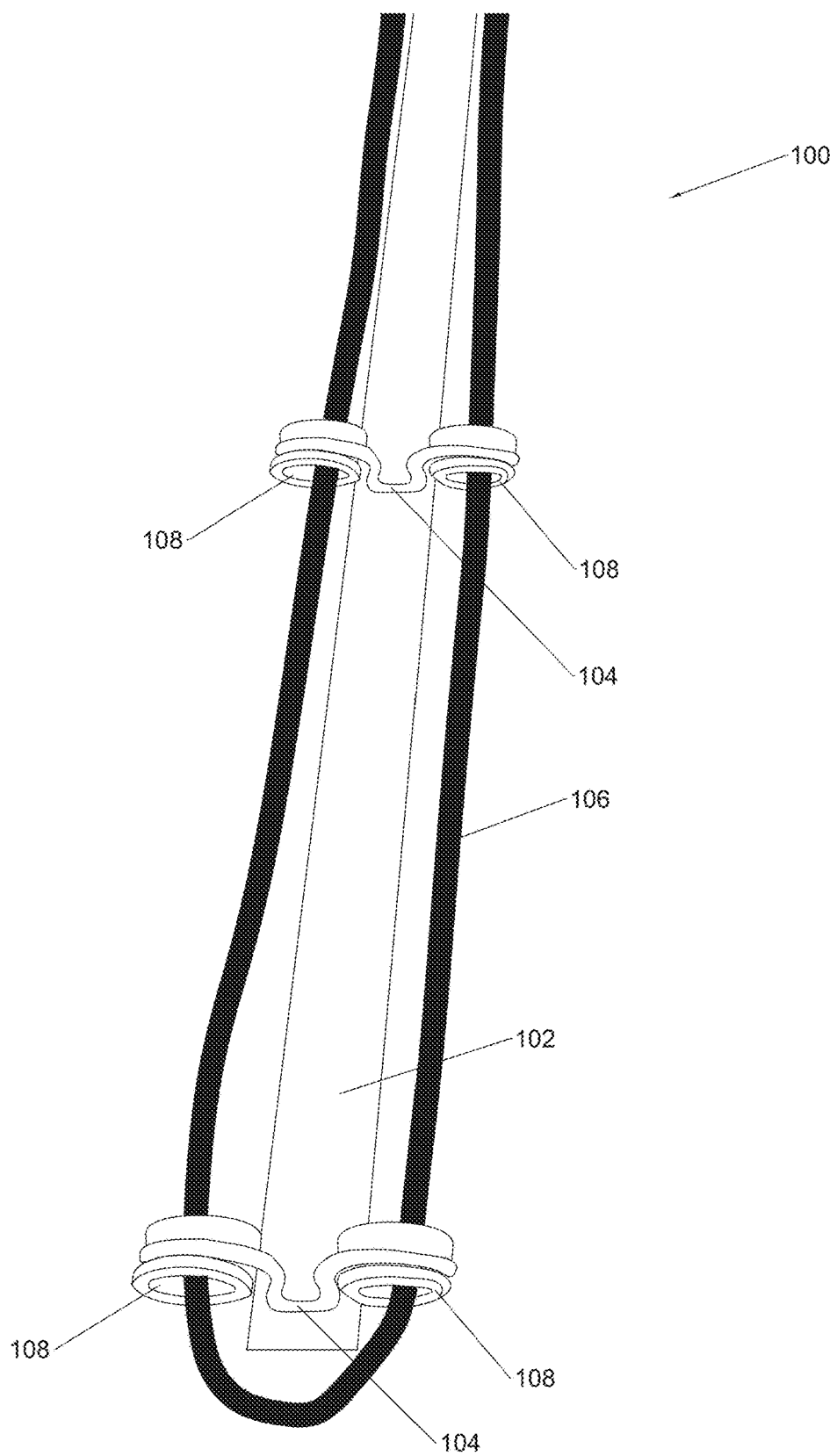
FIG. 1 depicts a heater according to an illustrative embodiment.

FIG. 1 depicts an illustrative heater 100. As the term is used herein, heater 100 includes rigid bar 102, heater clips 104 and a generally, non-coiled heating element 106. A rigid bar 102 is provided and is of sufficient length to correspond with the distance to be heated, which may be for example, about the length of the casing into which heater 100 will be inserted.

Figure 5:
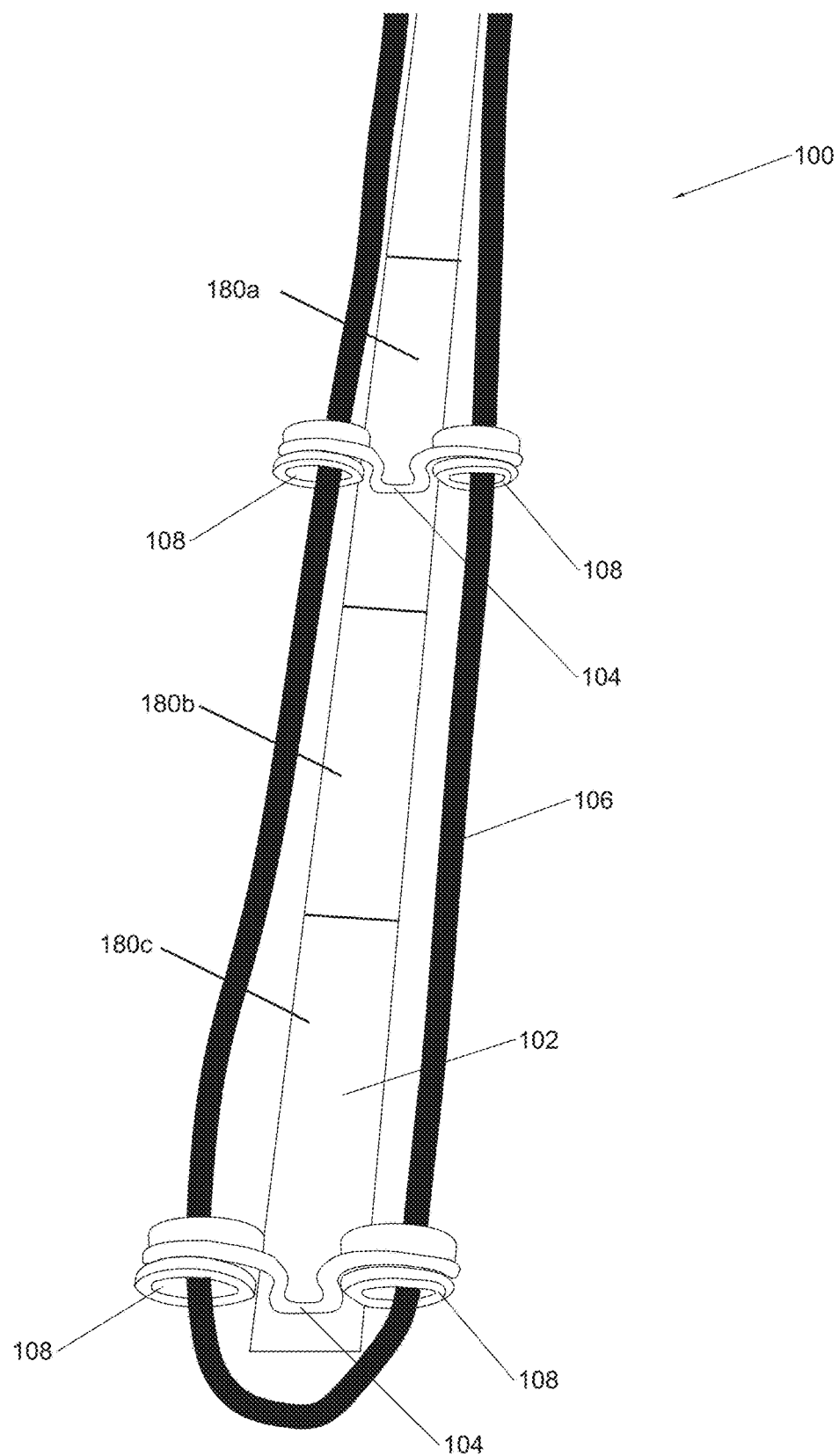
FIG. 5 depicts a heater with a rigid bar having a plurality of segments according to an illustrative embodiment of the invention.

Rigid bar 102 may be a single length, as shown in FIG. 1, or may be composed of segments that can be attached to one another to form different lengths for uniform or varied heating requirements. FIG. 5 depicts rigid bar 102 with segments 180 *a, b, c* as an illustrative example of a segmented rigid bar 102. Segmented rigid bars may also facilitate installation, particularly for relatively long heating lengths. In an illustrative embodiment, rigid bar 102 of heater 100 is constructed using 12-foot lengths of metal bars, such as stainless steel flat bar. Illustrative rigid bar cross-sectional dimensions include 3 millimeter by 19 millimeter. These dimensions may vary, for example, depending on the use of the heater. The weight of rigid bar 102 may be a factor in properly supporting heater 100 inside a casing. Most important may be the rigidity of rigid bar 102. Factors that may affect rigidity are, the material, length, cross-sectional dimensions and weight. In an illustrative embodiment of the invention, rigid bar 102 has a width in the range of 10 mm to 50 mm, and may have a thickness in the range of 2 mm to 10 mm.

Heater clips 104 are attached to rigid bar 102 and support a heating element 106. Heater clips 104 may be fixedly attached to rigid bar 102, for example by welding, or may be releasably attached. Whichever configuration is used, heater clips 104 should be configured to maintain a desired distance of a heating element 106 from the walls of the casing in which it is disposed, and from other portions of the heating element, i.e. from the heating element contacting itself. The spacing between the heater clips 104 on the rigid bar 102 may vary depending on the thickness of the heating element 106. Very thin heating elements require a tighter spacing and thicker heating elements allow for a wider spacing. The spacing between the heater clips 104 may range from 15 to 90 centimeters.

Heater 100 has a heating element 106, which may be for example, a NiChrome wire, or other suitable electric resistance heating wire. In an exemplary embodiment, heating element 106 is a malleable, high-temperature wire. As used herein, "NiChrome" refers to a nickel-chromium alloy. Nickel-chromium alloys that contain other metals may also be used. Typically, nickel will be the primary metal in the alloy, i.e. making up the largest percent of the metals. Heating element 106 may have a diameter in the range of 2 millimeters to approximately 11.7 millimeters, which may be, for example, a NiChrome wire gauge in the size range of 12 to 4/0 American Wire Gauge (AWG). Heat from heating element 106 is transferred to casing 116.

Heater clips 104 have guides 108 through which heating element 106 is thread. Heating element 106 is thread through guides 108 along one side of rigid bar 102 and then bent into a u-shape to return along the opposing side of rigid bar 102 through another series of guides 108.

In the embodiment depicted in FIG. 1, each heater clip 104 has two guides 108. Heater clips with single guides 108 may also be used, provided they are positioned to keep heating element 106 from touching itself or casing 116 (shown in FIG. 3).

Guides 108 are preferably constructed of an insulating material, for example ceramic (for example; alumina, mullite or zirconia) or porcelain, or other suitable high temperature insulating material that can withstand the temperatures to which they will be exposed in the system during operation.

The inner diameter of guides 108 should be sufficient to accommodate heating element 106. While the outer diameter of guides 108 should be of sufficient size to space heating element 106 from the inner surface of casing 116 and from other portions of heating element 106. Expansion or sagging of heating element 106, particularly when activated to produce high temperatures, is factored into the inner and outer diameters of guides 108. In an illustrative embodiment, guides 108 have a thickness of 5 mm to 50 mm and an inside diameter of 5 mm to 20 mm. The extent of sagging of heating element 106 may also be factored into the spacing of guides 108 along rigid bar 102. Further considered to avoid heating element 106 contacting casing 116 is the maximum width of heater 100 or any other dimension that may affect how heater 100 will settle into casing 116 when casing 116 is non-vertical. In an illustrative embodiment, heater 100 is dimensioned to remain substantially centered within casing 116, or within about 10% to 20% of the center.

Figure 2:
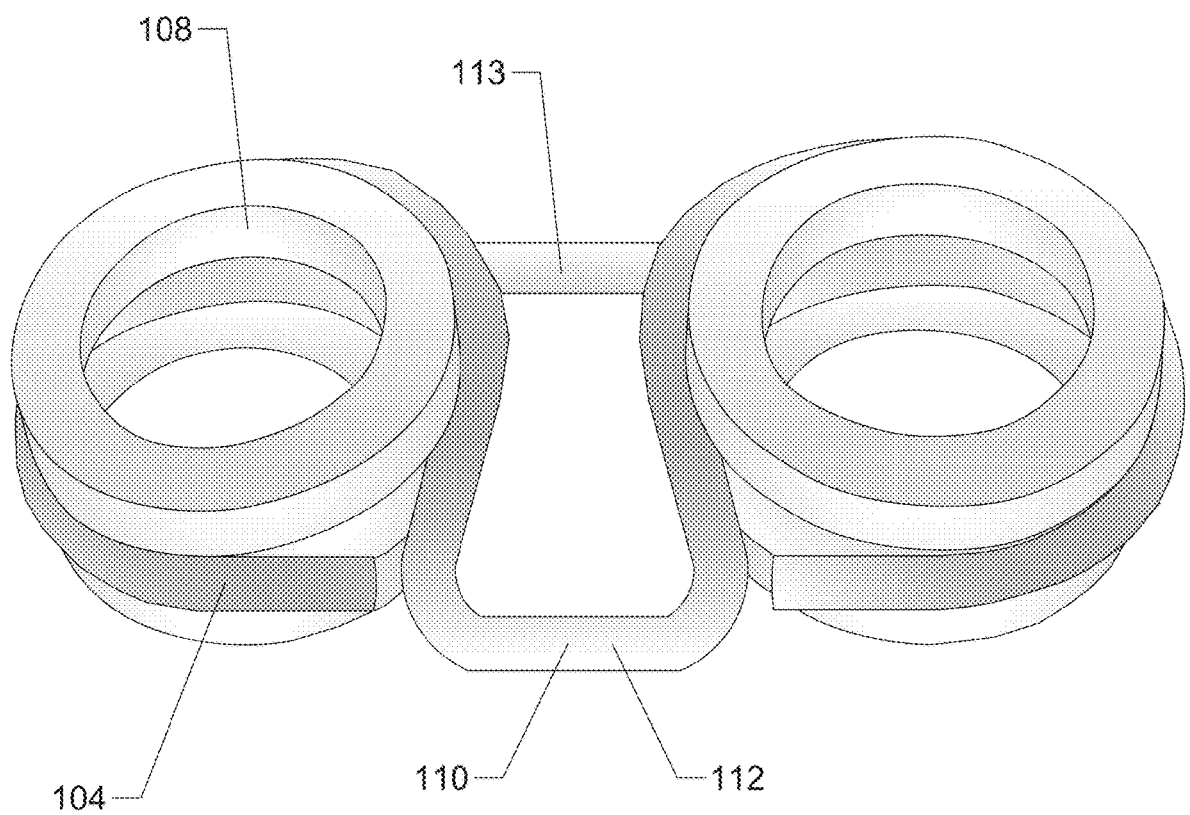
FIG. 2 depicts an illustrative embodiment of a heater clip.

FIG. 2 depicts an illustrative embodiment of a heater clip 104. In this embodiment, heater clip 104 includes a bracket 110 that may be attached to rigid bar 102, for example, at or in the vicinity of cross component 112. Additional cross components 113 may be added between guides 108 for greater structural support. Heater clips 104 may be exposed to high temperature such as in the range of about 0 degrees Celsius to about 1000 degrees Celsius. Heater clips 104 must maintain their structural integrity at those temperatures. Heater clips 104 may be made of stainless steel or NiChrome, for example. Other materials may be used, provided they withstand the temperatures, stresses and other environmental factors in which they will be placed.

Rigid bar 102 may serve multiple purposes. Rigid bar 102 provides support to position heating element 106 properly in casing 116. Rigid bar 102 may also be configured to provide selected heating characteristics. Rigid bar 102 may have a selected emissivity to provide additional, or more uniform, heating, through reflection back to casing 116 and, thus, into the material surrounding casing 116. Emissivity may be varied along rigid bar 102 to provide different heating levels. For example, polished stainless steel may reflect 90 percent of the infrared energy directly projected from heating element 106 to the rigid bar 102. The reflected energy then transmits to the portion of the casing 116 located furthest from heater 100 to provide more uniform heating in situations where casing 116 is at an angled or horizontal position. Rigid bar 102 may also heat up and thus affect the distribution and intensity of heat. Varying the characteristics of rigid bar 102 along its length, such as the emissivity for example, may also be used to vary heat levels.

Illustrative emissivity ranges include 0.01 to 0.6 as measured in the electromagnetic radiation spectrum of wavelengths in the 1 to 10 micron range. In an exemplary embodiment, the emissivity is less than 0.1. In a particular embodiment, rigid bar 102, comprising the selected alloy, is installed polished with an emissivity less than 0.1. The alloy will undergo some oxidation, which will increase the emissivity value. Thus, in an illustrative embodiment, rigid bar 102 may have an emissivity less than 0.1 with an operating emissivity value in the range of 0.1 to 0.35. Emissivity of rigid bar 102 may be varied along its length by varying the material or degree of polishing, for example.

Figure 3:
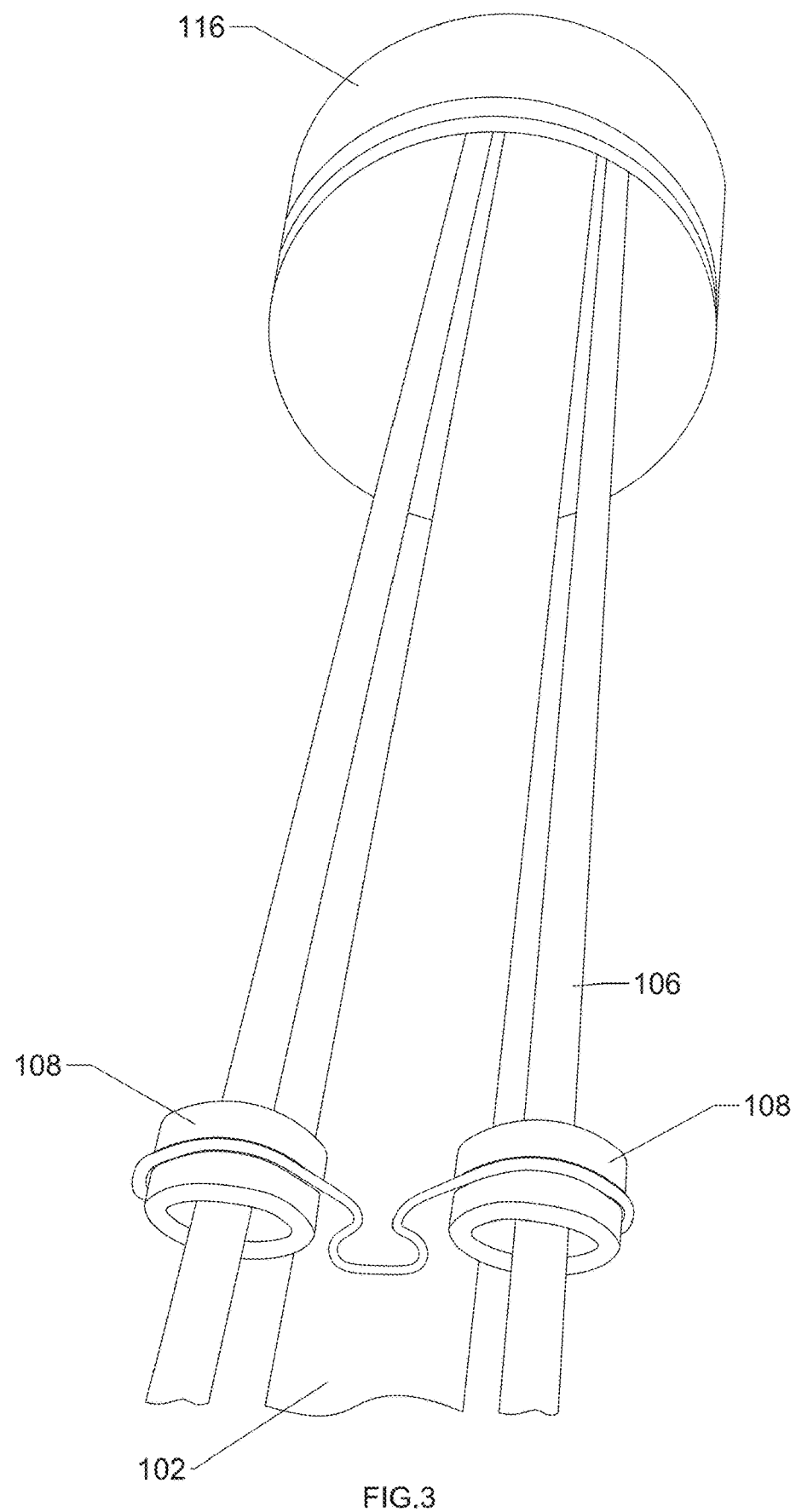
FIG. 3 depicts an embodiment of a heater being inserted into a horizontal heater well casing.

FIG. 3 depicts an embodiment of a heater 100 being inserted into a heater well casing 116, which typically comprises metal. In this illustrative embodiment, it can be seen that, although the total width of heating element 106 (a first leg and a second leg) plus rigid bar 102 is significantly less than the diameter of casing 116, heater 100 will not settle too low in casing 116 because guides 108 have sufficient diameter and are placed such that they will separate heating element 106 from the inner walls of casing 116. If heating element 106 sags when brought up to a desired temperature, guides 108 should be a sufficient size to keep heating element 106 from contacting casing 116.

Figure 4:
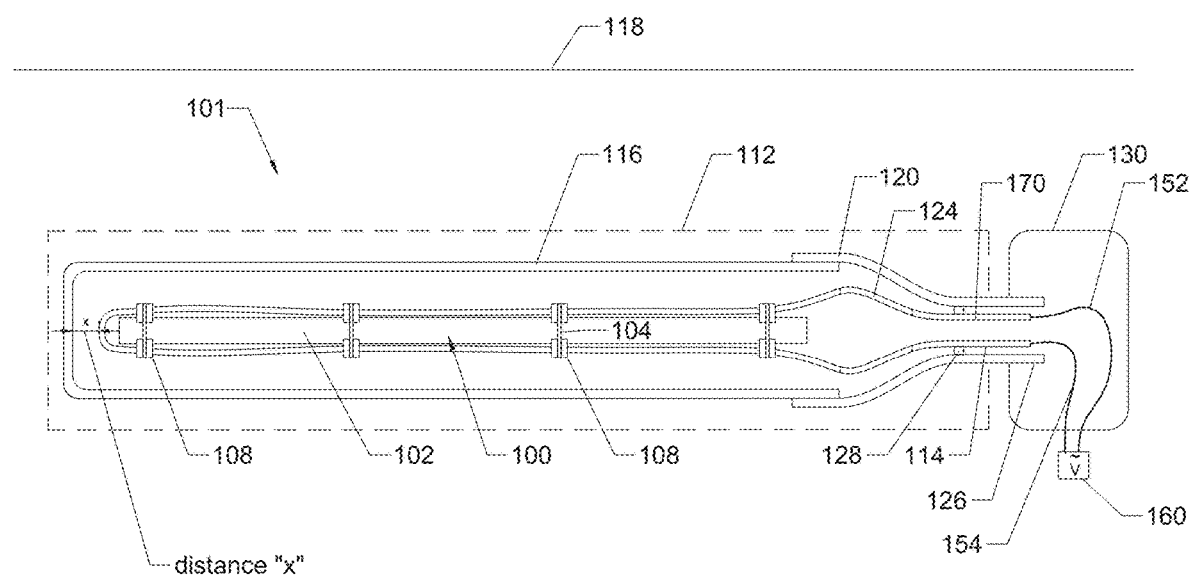
FIG. 4 is a schematic of a heater well with a heater inserted therein.

FIG. 4 is a schematic of a heater well 101 into which a heater 100 is inserted for heating soil, groundwater or rock to remove contaminants. In an illustrative embodiment, heater well 101 is placed within the soil, groundwater or rock (also called the "remediation material") that is targeted for contaminant removal. A hole 122 for heater well 101 may be created by boring or punching hole 122 into the remediation material and inserting a casing 116. Hole 122 is shown by a broken line and a cross section of casing 116 is depicted.

As used herein, "punched" means an installation method in which a hole 122 is formed by compressing or displacing subsurface material. In other subsurface embodiments, hole 122 may not be lined with a casing or may be lined with another material or component. For example, no lining may be required in solid, competent, bedrock. Heater well 101 may also exist in an above-ground heating application. For example, if soil or rock is excavated and staged in a pile or box at the surface, heater well 101 may extend through the remediation material interface 118 in an above-ground treatment application. Remediation material interface 118 is defined as the layer that separates the remediation material to be treated (soil, groundwater or rock) from its surroundings. In an above-ground or subsurface application, casing 116 may extend into the remediation material for a significant distance. In an above-ground application, several hundred feet of casing 116 may be laid out horizontally or otherwise, non-vertically, within the soil, rock or groundwater for heating. Casing 116 may extend to the maximum achievable depth or distance of drilling equipment, typically in the range of 30 meters to 60 meters for environmental remediation applications.

At the top edge of casing 116 is optional reducer 120. Reducer 120 and a pass-through 126 provide a cross-sectional pipe area less than that of casing 116 to reduce thermal conduction and convection outside the targeted remediation material. Reducer 120 may be a bell reducer, or an equivalent fitting that effectively reduces the diameter to pass-through 126 may be used, such as a reducing bushing. Reducing the thermal conduction and convection typically reduces heat losses and the temperature of surface components. Insulating material 128 may also be placed within pass-through 126 to further prevent or reduce conductive and convective heat transfer out of casing 116. Insulating material 128 may consist of any high-temperature flexible insulating media such as mineral wool, glass wool or ceramic cloth. Pass-through 126 might be constructed of stainless steel or ceramic to further reduce its thermal conductivity. Pass-through 126 accommodates heating element 106, a current delivery wire 170, and current return wire 114. Illustratively, current delivery wire 170 is an insulated wire that has a high temperature rating. Pass-through 126 supports electrical connection box or "junction box" 130. Junction box 130 can take many forms, including those known in the art. Because junction box 130 is typically near ambient temperature, it can use standard electrical components. Current delivery wire 170 and current return wire 114 connect to power source wires 152, 154, respectively, within junction box 130. Power source wires 152, 154 provide electrical power from a power source 160, which applies different voltages to wires 152, 154. Power Source wires 152, 154 may be, for example, standard copper wires, and may be connected to current delivery wire 170 and current return wire 114, respectively, by any conventional connection means. In an illustrative embodiment, power source wires are connected to nickel cold pins 124. The design converts to a nickel cold pin section and then a copper wire inside heater well 101 to reduce heating near the entrance of the casing where the heater is inserted.

Electrical current is delivered by power wire 152 to heating element 106 through current delivery wire 170 that passes through pass-through 126 at or near the opening of heater well 101. Pass-through 126 extends into junction box 130. Pass-through 126 may be for example, a stainless steel pipe or other hollow component that reduces thermal conduction and convection. In an exemplary embodiment, pass-through 126 is a stainless steel pipe of sufficient diameter to accommodate heater 100. The optimum material of pass-through 126, like other components of heater well 101, depends, at least in part, on the environment. For example, in certain conditions, corrosion-resistant metals or alloys may be beneficial.

Heating element 106 extends to varying distances within casing 116, but in an exemplary embodiment does not extend any closer to the bottom of casing 116 than a distance "X" to allow room for thermal expansion, without heating element 106 coming into contact with casing 116.

Various embodiments of the invention have been described, each having a different combination of elements. The invention is not limited to the specific embodiments disclosed, and may include different combinations of the elements disclosed, omission of some elements or the replacement of elements by the equivalents of such structures.

The invention claimed is:

1. A heater comprising:
   an emissive rigid bar having an emissivity in the range of 0.01 to 0.6;
   a plurality of heater clips fixedly attached along the emissive rigid bar;
   each of the plurality of heater clips comprising one or more non-conductive guides affixed to the emissive rigid bar;
   a non-coiled, uninsulated, u-shaped resistive heating element with a first leg and a second leg, the first leg disposed through a first series of the one or more non-conductive guides, the second leg disposed through a second series of the one or more non-conductive guides, wherein the first leg and second leg are disposed parallel to one another and to the emissive rigid bar;
   the first leg configured to, either directly or indirectly, attach to a first electrical conductor of a power source; and
   the second leg configured to, either directly or indirectly, attach to a second electrical conductor of the power source,
   the first electrical conductor and second electrical conductor having a differing voltage potential between the first electrical conductor and second electrical conductor to thereby supply electrical current to the non-coiled, uninsulated, u-shaped resistive heating element;
   wherein the emissive rigid bar with the non-coiled, uninsulated, u-shaped resistive heating element is configured to be inserted into a casing of a heater well,
   wherein the emissivity of the emissive rigid bar is configured to be varied along a length of the emissive rigid bar.

2. The heater of claim 1 wherein the emissive rigid bar comprises a plurality of segments that are configured to attach to one another to form different lengths.

3. The heater of claim 2 wherein the emissive rigid bar is constructed of stainless steel flat bar having cross-sectional dimensions of 3 millimeters by 19 millimeters.

4. The heater of claim 1 wherein the weight of the emissive rigid bar is selected to support the heater inside the casing without the non-coiled, uninsulated, u-shaped resistive heating element contacting the casing.

5. The heater of claim 1 wherein the heater clips are configured to maintain a desired distance between the non-coiled, uninsulated, u-shaped resistive heating element and walls of the casing and keep the first leg and the second leg of the non-coiled, uninsulated, u-shaped resistive heating element from contacting each other.

6. The heater of claim 1 wherein the one or more non-conductive guides comprise ceramic, or porcelain, or other insulating material that can withstand temperatures to which the one or more non-conductive guides are exposed during remediation processes.

7. The heater of claim 1 wherein each of the one or more non-conductive guides has a thickness of 2 to 50 mm and an inside diameter of 2 to 45 mm.

8. The heater of claim 1 wherein the heater is constructed with a maximum diameter selected to position the heater within a central part of the casing to achieve a desired heat distribution within the casing without the non-coiled, uninsulated, u-shaped resistive heating element contacting the casing even upon sagging.

9. The heater of claim 1 wherein the electrical conductors comprise a nickel cold-pin and copper conductor.

10. The heater of claim 1 wherein the non-coiled, uninsulated, u-shaped resistive heating element has a diameter in the range of 2 millimeters to 12 millimeters.

11. The heater of claim 1 wherein the non-coiled, uninsulated, u-shaped resistive heating element comprises a NiChrome wire.

12. The heater of claim 1 further comprising the casing wherein the heater is disposed within the casing.

13. The heater of claim 1 wherein the rigid bar has an emissivity in the range of 0.1 to 0.35.

14. The heater of claim 1 wherein the emissivity of the emissive rigid bar is configured to be varied along the length of the emissive rigid bar by varying material or degree of polishing of the emissive rigid bar.

* * * * *